US00RE39611E

(19) United States
(12) Reissued Patent
Zettel et al.

(10) Patent Number: US RE39,611 E
(45) Date of Reissued Patent: May 8, 2007

(54) FILTER WITH STIFFENING RIBS

(75) Inventors: Steven A. Zettel, deceased, late of Cranston, RI (US); Raymond Scoboria, Dearborn, MI (US)

(73) Assignee: ACS Industries, Inc., Woonsocket, RI (US)

(21) Appl. No.: 10/412,150

(22) Filed: Apr. 11, 2003

Related U.S. Patent Documents

Reissue of:
(64) Patent No.: 6,277,166
Issued: Aug. 21, 2001
Appl. No.: 09/282,372
Filed: Mar. 31, 1999

(30) Foreign Application Priority Data

Dec. 15, 1998 (GB) ..... 9827576

(51) Int. Cl.
*B01D 46/00* (2006.01)

(52) U.S. Cl. ..... 55/385.3; 55/525; 280/736; 280/740; 280/742; 422/167

(58) Field of Classification Search ..... 55/525, 55/526, 385.3; 422/167, 305; 210/499, 525, 210/496; 280/736, 728.1, 740, 741, 742, 280/737, 738, 743.1
See application file for complete search history.

(56) References Cited

U.S. PATENT DOCUMENTS

| | | | | | |
|---|---|---|---|---|---|
| 2,334,263 | A | * | 11/1943 | Hartwell | 210/494.2 |
| 3,448,862 | A | * | 6/1969 | Kudlaty | 210/489 |
| 3,696,033 | A | * | 10/1972 | De Fano et al. | 210/460 |
| 3,985,076 | A | * | 10/1976 | Schneiter et al. | 102/531 |
| 4,017,100 | A | * | 4/1977 | Gehrig et al. | 280/736 |
| 4,322,385 | A | * | 3/1982 | Goetz | 422/165 |
| 4,683,010 | A | * | 7/1987 | Hartmann | 148/287 |
| 4,889,630 | A | * | 12/1989 | Reinhardt et al. | 210/490 |
| 4,902,036 | A | * | 2/1990 | Zander et al. | 280/736 |
| 5,064,459 | A | * | 11/1991 | Unterforsthuber et al. | 55/512 |
| 5,204,068 | A | * | 4/1993 | O'Loughlin et al. | 422/180 |
| 5,308,370 | A | * | 5/1994 | Kraft et al. | 55/487 |
| 5,318,323 | A | * | 6/1994 | Pietz | 280/736 |
| 5,449,500 | A | * | 9/1995 | Zettel | 422/179 |
| 5,516,144 | A | * | 5/1996 | Headley et al. | 280/730.2 |
| 5,525,170 | A | * | 6/1996 | Stark et al. | 149/85 |
| 5,660,606 | A | * | 8/1997 | Adamini | 55/337 |
| 5,665,131 | A | * | 9/1997 | Hock et al. | 55/487 |
| 5,849,054 | A | * | 12/1998 | Fujisawa | 55/486 |
| 6,196,581 | B1 | * | 3/2001 | Katsuda et al. | 280/736 |
| 2001/0007189 | A1 | * | 7/2001 | Zettel et al. | 55/385.3 |

FOREIGN PATENT DOCUMENTS

| | | | |
|---|---|---|---|
| DE | 2350101 | * | 4/1975 |
| DE | 44 17 347 A1 | | 11/1995 |
| EP | 0 370 734 A2 | | 5/1990 |
| GB | 1205300 | * | 9/1970 |
| GB | 2046125 | * | 11/1980 |
| GB | 2213404 | * | 8/1989 |
| WO | 9414608 | * | 7/1994 |

OTHER PUBLICATIONS

Ex parte Froeschle and Schreiber, 223 USPQ 190.

(Continued)

*Primary Examiner*—Duane S. Smith
(74) *Attorney, Agent, or Firm*—Bradley N. Ruben

(57) ABSTRACT

Annular wire mesh filters for airbag assemblies for passenger vehicles are provided with a series of ribs extending parallel with the axis of the annulus and along the outer wall. The ribs provide added strength to the filter. Also provided is a method of manufacturing the compressed mesh filter with a uniform density, and a molding tool (mold, mandrel, and plunger) for making the compressed mesh articles of this invention.

12 Claims, 3 Drawing Sheets

OTHER PUBLICATIONS

"Translation of the Suit intended to be filed with the Federal Patent Court, dd. Jan. 27, 2003; Re: German Patent 198 5 865.2–23; Title: 'Wire mesh filter having an annular geometry'".

Labeled "D2.1", one page document in German with "Datum: 19.12.97".

Labeled "D2.2" and "D2.3", two drawings, each with notations in German, logo for TRW in legend.

Labeled "D2.4", four page document in German.

Labeled "D2.5", two page document in German with "TRW Airbag Systems GmbH" in upper right, with "Datum: 19.12.97".

Labeled "D4.1", one page drawing with German notations, from "Eberspächer".

Labeled "D4.2", one page, in German, with "Rhodius Drahtgestrick" logo to "Firma, J. Eberspächer" with "Datum, 10.11.94/RG".

Labeled "D4.3", one page, in German, with "Producktdatenblatt 15PO57I15.01616" on top line.

Labeled "D4.4", three pages of large size drawings: "Pressform Nr 442, PF–265–3"; Auβenrohr, PF–265–3; and "Stempel, PF–265–3".

Labeled "D5.1", one page drawing, with German notations, "Drahtgeflechtring vorn, 222 6431 021" from "Zeuna A Starker".

Labeled "D5.2", one page, in German, with "Rhodius Drahtgestrick"in upper right, to "Firma, Zeuna–Starker GmbH & Co.KG" with "Datum, 19.11.97/pov".

Labeled "D5.3", one page, in German, with "Produktdatenblatt 09PO77I08.019R18.0"and, "Ref/Datum: 4/27.05.1997" in upper line.

Labeled "D5.4", 13 pages in German with "DBW–RUTZENHÖFER, Metallgestricke—filter" with logo in upper right, and 1 drawing page.

Labeled "D5.5", 4 sheets of drawings, first labeled in handwriting "PF—Nr. 240 A0315".

Labeled "D6.1", one drawing sheet, with German notations, "Drahtgestrickring, 11.21.190.30.0.23" from Eberspächer.

Labeled "D6.2", one page, in German, from "Rhodius Drahtgestrick" to "Firma, Eberspächer GK Werk Menesa" with "Datum, 10.05.93/RG".

Labeled "D6.3", two drawing sheets, with handwritten notations in German.

Labeled "D7.1", one drawing sheet, with German notations, "Dämpferkissen" with printed "IWK Regler + Kompensatoren GmbH" in legend.

Labeled "D7.2", three pages, in German, from "Rhodius Drahtgestrick" to "Firma, IWK Regier und Kompensatoren GmbH".

Labeled "D7.3", two drawing sheets, both with "Max Rhodius GmbH" printed legend, "IWKARenault–Sonderform, PF–349–3", and "Pressform Nr. 534, PF–349–3".

* cited by examiner

FILTER WITH STIFFENING RIBS

Matter enclosed in heavy brackets [ ] appears in the original patent but forms no part of this reissue specification; matter printed in italics indicates the additions made by reissue.

[This application is based on provisional application number 60/72,325 filed Jan. 23, 1998.] *This application claims the benefit of prior foreign application GB 9827576, filed Dec. 15, 1998.*

BACKGROUND OF THE INVENTION

1. The Field of the Invention

This invention relates to filters, and especially filter elements useful for filtering hot gases used in the deployment of passenger airbags, and to methods for making and using such filters, and to airbags and vehicles containing the same.

2. The State of the Art

Relatively recent concerns with passenger safety in land vehicles has led to the development of "airbag" technology, a passive restraint and protection system comprising a bag or pillow-like bladder that is inflated in an extremely short period of time using compressed or chemically-generated gas to fill the bag. The inflated bag is disposed or deployed between the front or side of the passenger and an interior portion of the vehicle's passenger compartment.

The first generation of pyrotechnic airbag vehicle occupant restraint systems used azide compositions (typically sodium azide, $NaN_3$, mixed a heavy metal oxide) to generate the gas used to inflate the airbag. These explosive compositions generate a gas at over 1,000° F. during the initial phase of the gas generation reaction. A large amount of condensable and molten and/or solid particulate matter is generated concurrently with the gas. Much of this matter is not only extremely hot but also of a caustic composition, and the particulate matter, travelling a high velocity, is potentially dangerous to the integrity of the bag and the occupant to be protected thereby. Some airbag designs included large vent holes in the bags for venting the gas into the passenger compartment, and so the gas used to inflate these bags must be filtered to prevent the particulates from entering the passenger compartment with the vented gas. In these designs, all of the gas generated escapes the reaction chamber and is propelled towards the airbag, so that the gases and any particulates would undoubtedly impinge at least on the bag itself if no filter were present. If no measures are taken to ameliorate the degradative effects of this mixed phase reaction mixture, the gases and/or particulates would penetrate the bag, likely causing its failure and, in the most serious situations, causing injuries to the passenger.

Various measures were taken to reduce the degradative effects of the gas, some of which are discussed in U.S. Pat. Nos. 4,902,036 and 5,318,323, both of which are incorporated herein by reference. One technique for reducing the degradative effects was the use of sacrificial layers to slow down the particulate material, and the use of static centrifugal or impingement particle separation techniques. The art also resorted to using denser and/or longer filter devices. With both of these approaches, there is a design trade-off between filtering the gases and providing a pressure drop small enough to avoid interfering with the rate at which the airbag inflates. There are other trade-offs, as particulate deflection devices are typically expensive machined parts which are fabricated from heavy steel plate (because they are not amenable to fabrication by stamping, their cost of manufacturing is increased). In general, the airbag designers had to contend with removing condensed solid poisonous products (usually unreacted sodium azide and sodium oxides produced in the reaction), cooling the gases before they inflated the cushions, and providing a homogeneous and uniformly distributed gas flow generated from an explosive source.

Many filtering devices used today comprise layers of metal screens of various mesh sizes and one or more layers of a non-combustible fibrous material packed between the screens. The efficiency of this type of filter is dependent upon how tightly the material is packed; a tighter packing leads to more efficient filtering but also to a higher pressure drop. According to the above-referenced '323 patent, there is also a problem with quality control in the mass fabrication of such screen-mat composites with respect to providing a uniform pressure drop across any given filter made.

Yet another problem in designing airbag filter devices is that as the filter becomes clogged, the pressure drop across the filter increases. Accordingly, the mechanical stresses on the filter are increased, and the gas and particulates move through the filter at a higher velocity, necessitating an improved filter strength and toughness to withstand the higher flow rate through, pressure drop across, and particulate velocity into the filter.

Besides the aforementioned patents, typical filters for airbags are made from a compressed wire mesh or steel wool, such as described in U.S. Pat. No. 3,985,076 (metallic mesh), EP 674,582 (sintered metallic fiber structure), U.S. Pat. No. 4,017,100 (multilayer structure of glass fibers, steel wool, and screens and perforated plates), DE 2,350,102 (glass wool), GB 2,046,125 (metal spheres partially sintered together to form a rigid, porous body), U.S. Pat. No. 5,204,068 (metal fiber felt comprising coated fibers, such as nickel, coated with silicon compounds), WO 94/14608 (metal wire mesh to which a non-woven web of metal fibers is bonded by sintering), and others, the disclosures of which are all incorporated herein by reference. The gas generating composition, often an azide (azoimide) composition with copper, generates hot gases and particles of copper slag. The desire of the designer is to filter the copper slag particles so that the molten metal droplets do not impinge the airbag. The final filter design became a trade-off between (i) having a sufficiently high density of filter material to catch the slag particles, (ii) providing sufficient mass in the filter to cool the filtered slag particles before they melt through the mesh or wool elements of the filter or fragment into smaller droplets that might do the same, and (iii) the total density and weight constraints of the filter. That is, if the filter is made of very fine wire mesh or wool to assure catching all of the molten slag particles, then the mesh or wool fibers will have insufficient mass to cool the impinged slag particle to a solid, and so the molten slag particle melts through the mesh or wool and/or it fragments into smaller particles that may eventually pass through the filter and impinge the airbag.

The new generation of gas generators employ cleaner and less toxic non-azide gas-generating compositions (e.g., as described in U.S. Pat. No. 5,525,170, disclosure of which is incorporated herein by reference) that provide relatively more gas than the azide-based compositions. While the need to filter the gas generated is thus less of a concern, federal government standards exist setting limits on the allowable amounts of soluble and insoluble particulates in the gas generated, and so there is still a need to filter the gas. The need to cool the gas generated is still a necessary step in the deployment of the airbag. Moreover, these newer generation gas generators still yield a significant explosive force against which the filter element must be stabilized.

SUMMARY AND OBJECTS OF THE INVENTION

One object of this invention to provide a relatively inexpensive and yet tough filter for airbags and similar inflatable passive safety devices.

Another object of this invention is to provide a simple airbag filter that has reinforcement to better withstand the explosive force of the gas generation.

Still another object of this invention is to provide a light-weight, inexpensive, and effective filter device for airbags.

These and other objects of the invention are achieved in one aspect by a wire mesh filter deformed to create a plurality of ribs around the circumference of the filter. The filter can be deformed by being pressed into a mold. The circumference of ribs provides an improved hoop strength for the filter.

DETAILED DESCRIPTION OF SPECIFIC EMBODIMENTS

In brief, wire of a particularly chosen type and diameter is knitted into a knit mesh tube having a particular width and density for the filtering application desired. A piece of the mesh tube is cut to a particular weight that is a function of the weight and filtering requirements of the environment and fluid to be filtered. The mesh tube is then pressed into the desired annular shape of a filter using a female mold, a mandrel, and a plunger or press to produce a filter having the desired physical dimensions, weight, and density. The annular filter is then further shaped in a mold to deform the outer annular circumference into a series of ribs.

Figure 1C:
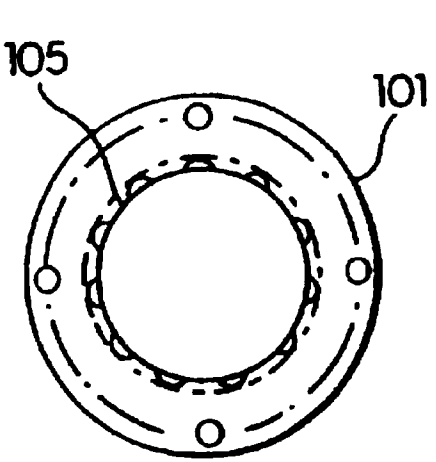
FIGS. 1A–1C depicts idealized front, side, and rear views of a molding tool used to fabricate the novel filters of this invention.
Figure 1A:
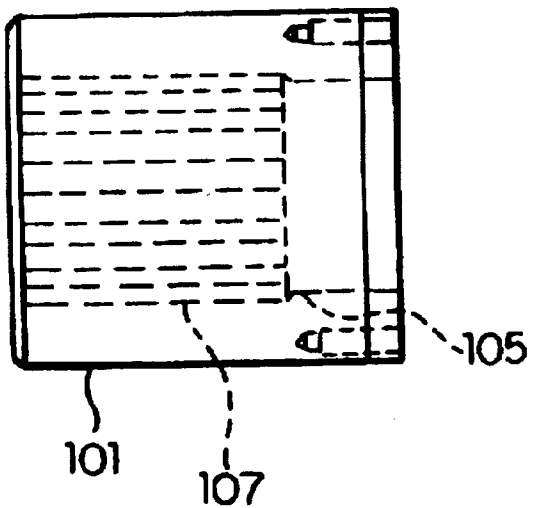
Figure 1B:
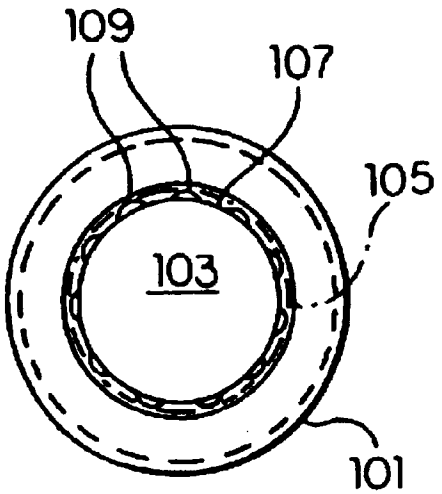
Figure 2A:
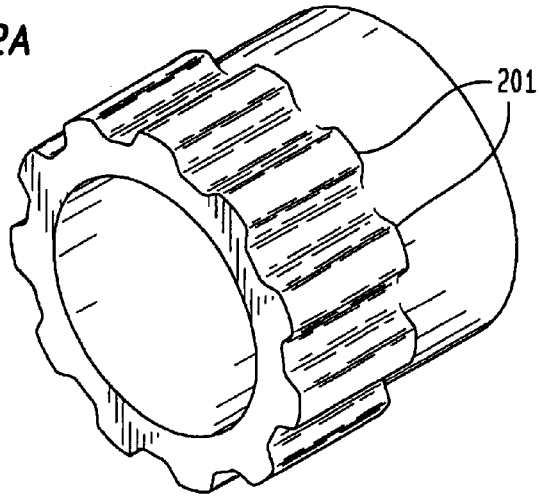
FIGS. 2A–2D depict, respectively, two perspectives, an end view, and a side view, of filters having ribs made according to the present invention.

Shown in FIG. 1 (left to right) are a top, side, and bottom view of the mold 101 used to form the ribs on the mesh filter. The mold is preferably made of a hard tool steel. The mold has an internal cavity 103 defined by an inner annular circumference. The tool shown in FIG. 2 is used to make a filter having ribs as shown in FIGS. 2A and 2D, in which the ribs extend along only a portion of the axial length of the filter. Returning to FIG. 1, to make the filter shown in FIGS. 2A and 2D, the tool preferably has two inner annular circumferences 105 and 107. One of the annular circumferences includes a plurality of grooves or channels 109 spaced equally about the circumference and extending parallel with the axis of the mold (orthogonal to the circumference). As the mesh filter is forced into the tool by the plunger, the channels deform the outer perimeter of the filter so that the mesh occupies the whole of the internal cavity of the molding tool. Thereafter the filter with the ribs is removed from the molding tool.

Figure 2B:
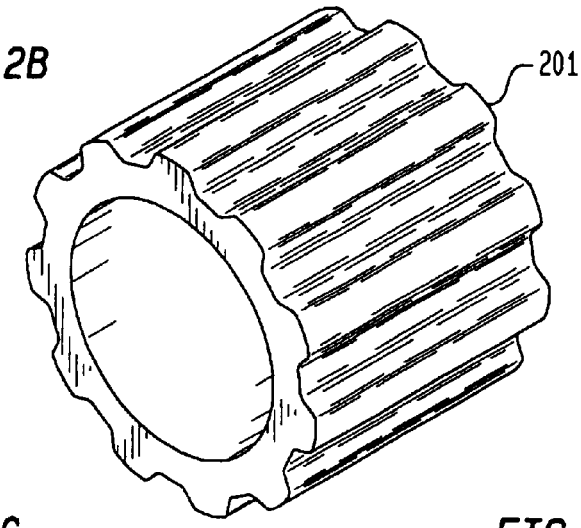
Figure 2C:
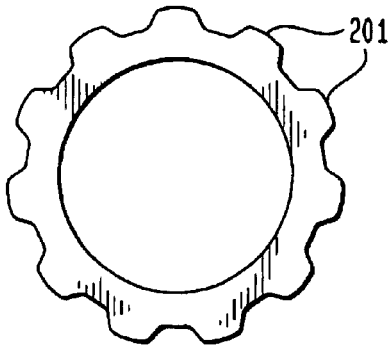
Figure 2D:
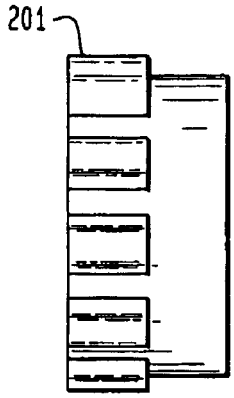

Turning to FIGS. 2A–D, FIG. 2A shows an idealized perspective view of the filter made with the tool shown in FIG. 1. The molding tool deforms the outer perimeter of the filter so that the mesh occupies the channels in the molding tool. When demolded, the outer perimeter of the mesh filter will have a plurality of ribs 201 spaced about the outer perimeter. Because the tool of FIG. 1 has two inner annular circumferences (i.e., having different circumferences or one circumference having channels and the other devoid of channels), the ribs of filter of FIG. 2A extend only partially along the axial length of the filter. FIG. 2D depicts a side view of the filter of FIG. 2A. In the alternative, the molding tool can have a single inner cavity and inner annular circumference with channels extending along the entire inner axial length of the molding tool. When such a tool is used, the resulting filter has a geometry as shown in FIG. 2B, in which the ribs extend along essentially the entire axial length of the filter element. FIG. 2C is an idealized end view of the filter of FIG. 2A or 2B when viewed from the end of the filter to which the ribs extend.

The preferred filter elements in the present invention comprise a wire mesh compressed into a desired geometry, preferably annular, and preferably circular or elliptical (oval). The mesh is preferably produced by a conventional wire knitting machine (such as any commercially available wire mesh knitter, as are available from, for example, Tritech International, England); examples of wire meshes and knits used as scals and support mats in high temperature applications can be found in U.S. Pat. Nos. 4,683,010 and 5,449,500, the disclosures of which are incorporated herein by reference. The wire knitting machine typically produces a pliable mesh sleeve.

The wire used to make the mesh can be of various compositions, and preferably is selected from stainless steels, including austenitic and nickel alloys, such as, but not limited to, 304, 309, and 310 grades of stainless steel. The composition of the wire is chosen to be chemically compatible (to the extent possible) with the environment in which the filter is disposed and with the fluid (or mixed phases) being filtered. Accordingly, other metals, and even polymeric fibers, can be used, depending upon the environment and the properties of the materials being filtered, and to the extent that such can be formed into a filter having ribs spaced along its outer circumference.

The wire for the mesh used for fabricating airbag filters preferably ranges from about 0.03 in. dia. to about 0.002 in. dia. (from about 0.75 mm to about 0.05 mm in diameter, or from about 21 to about 47 gauge (Brit. Std.); although larger and/or smaller wire can be used). If multiple meshes are used together in a single filter, it is preferred that the largest diameter wire be used for the innermost filter zone(s) and that smaller gauge wires be used for the outermost filter zone(s), and that the wire size decrease in the radially outward direction. As mentioned above, the explosive charge releases particulates of molten metal (slag) that impinge the filter. The use of a thicker mesh wire and/or a more dense radially interior portion tends to ameliorate the deterioration of the filter due to the corrosive mixture. For example, near the center of the filter where the charge explodes and slag is formed that impinges the filter; a thicker wire (a) has a higher strength than a thinner wire to better absorb the explosive force and (b) has a greater effective heat capacity that can tolerate a larger and/or hotter slag particle better than a relatively thinner wire (e.g., before a molten slag particle burns through the wire).

The wire used for the entire filter, or any of the individual parts or sections of the filter, can be round or flat in cross-section. The wire used also can be a combination of two or more different geometries and/or compositions of wire. Different types, diameters, and/or geometries of wire can be knit into a single mesh to provide a mesh having a uniform composition of different wires or a composition of wires that changes along the length of the mesh tube. Further, additional strength can be obtained by heat treating; e.g., annealing the filter in an oxygen-containing atmosphere (such as ambient); such an annealing process is described in the aforementioned U.S. Pat. No. 5,449,500 (the disclosure of which is incorporated herein by reference). The same wire can be used for two different sections of the filter and compressed or compacted to provide a different density in each section. Likewise, different wires (regarding geometry and/or composition) can be used to produce different filter sections each having the same density. Besides a wire mesh and steel wool, one or more sections of the filter can include other types of wire filter media (such as those commercially available from Memtec, Ltd., Australia). Such media may also comprise a compacted and/or annealed wire mesh, and if obtained separately, can be fabricated into a desired shape (e.g., a strip cut and welded into a circular loop) before being integrated with the compressed mesh of the present invention.

The density of the filter is typically specified by the designer of the entire airbag assembly. Knowing the volume of the filter (also a design constraint based, for example, on the steering wheel size and configuration), and the specific density of the wire (stainless steel typically has a density of about 0.29 lb./in.$^3$), the density of the filter can be determined. Thus, for any particular zone of the filter having a specified density, the weight of mesh required to fit into that filter zone volume can be calculated from the density.

It is preferred that the final filter article be made in a series of compressions starting with the knit wire tube. As has been noted, the density of the final filter is a design parameter of the air bag assembly. When it is desired to provide a filter having an essentially uniform density, it is preferred that the filter be formed in a series of compressions. In the first compression, the desired amount of knit wire tube is pressed into an annulus using a cylindrical female mold with a mandrel (to provide the outer and inner diameters of the annulus) and a plunger in the geometry of a sleeve to force the knit tube into the space between the mandrel and the female mold. In the mold, this intermediate article can be defined with reference to base end at the bottom of the mold, and a work end contacted by the plunger. Typically, for example, 14 inches of knit wire tube is compressed into a 3½ to 4 inch annulus (measured along the axis of the annulus).

Thereafter, the intermediate annulus is placed into a mold of the type as shown in FIG. 1, again comprising a female mold and a mandrel, and a sleeve plunger is used to press the annulus so that it conforms to the mandrel and the female mold circumference having the grooves, effectively causing the wire mesh to flow. To diminish the uneven compression, and thus uneven density, that is likely to occur, the "work" end of the intermediate annulus is placed first into the mold so that it becomes the "base" end in the next operation; that is, the intermediate article is flipped-over so that it is compressed from the opposite end than it was originally. In this next step, the 3½ to 4 inch intermediate annulus is compressed into an annulus about one to two inches in length (along the axis of the annulus). To facilitate this second compression molding step, the dimensions of the mold used in the first compression molding step should provide an annulus having a larger I.D. and a smaller O.D. than the final article, so that the intermediate annulus easily fits over the mandrel and into the mold used to make the final article. Presses delivering 70 to 80 tons of pressure, and possibly up to 100 tons, are required to deform the mesh and produce these articles.

Figure 3B:
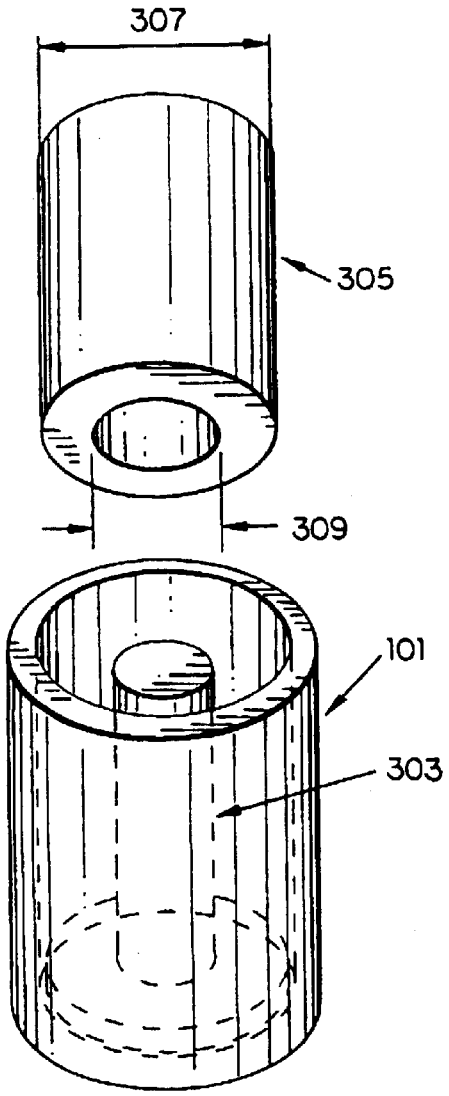
FIGS. 3A and 3B depict the plunger and the combination female mold and mandrel, respectively, for this invention.
Figure 3A:
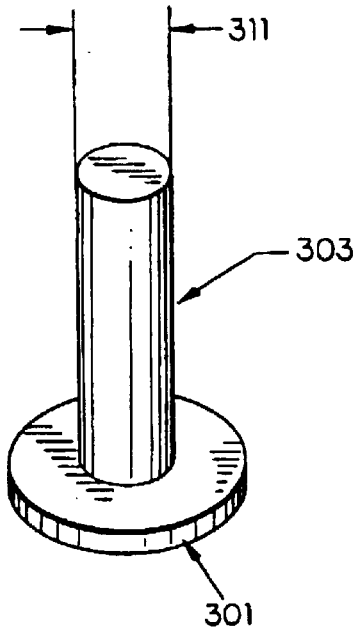

The apparatus used for the molding is shown also in FIGS. 3A and 3B. In particular, FIG. 3A depict a mandrel for use with this invention. The mandrel has a disk shaped base 301 to which a mandrel 303 is attached orthogonally in the center. The size of the base should be such that it can be fit securely into the bottom of the female mold, as shown in FIG. 3B (in which the grooves are not shown). The knit mesh tube or the intermediate annulus is positioned over the mandrel that is positioned in the female mold cavity, and the sleeve plunger 305 is pressed into the mold. The plunger has an outer diameter 307 that corresponds with the inner diameter of the female mold, and an inner diameter 309 corresponding with the outer diameter 311 of the mandrel. As in the present invention where it is desired to provide ribs on the outside of the compressed mesh article and there are grooves on the inner wall of the female mold, the plunger has ribs corresponding to the grooves on the inner wall so that a good seal is made with the mesh being compressed and to assure that the mesh flows into the mold geometry where desired (that is, otherwise the mesh will flow around the plunger and the end of the compressed article will not be flat).

In certain embodiments it may be desirable to have a relatively long compressed mesh article that is too long for the mold (or a mold of the desired length would be too expensive). In such cases, multiple annular compressed mesh articles can be joined end to end, preferably by means of a joint. The preferred joint is a tongue-and-groove configuration, wherein an intermediate portion of the article would have a tongue in one end and a groove in the other. This can be accomplished by altering the configuration of the base of the mandrel and the working end of the plunger. In particular, a circular groove or ridge can be formed in the mandrel base so that when the wire mesh is forced thereagainst by the plunger, a tongue or groove (respectively) will be formed in the corresponding abuting end of the compressed mesh article. The working end of the plunger is modified accordingly to have the opposite configuration of a ridge or groove, thereby forming a groove or tongue in the opposite end of the compressed mesh article. Thus, compressed mesh articles formed this way have a groove on one end and a tongue on the other, and so can be joined end to end to provide a longer (axially) article.

When the compressed mesh articles of this invention are used in airbags, the airbag manufacturer provides a can into which the mesh filter is inserted, and into the annulus the explosive charge is loaded (with a primer) and the can is sealed. The can includes a number of vent holes through which the gas generated escapes, and the holes are usually sealed with paper as a barrier (e.g., against water). Prior to this invention, the manufacturer would have to insert a locator plenum into the can to locate the position of the filter, and then around the filter a welded, perforated tube would be inserted to provide increased hoop strength, the plenum is used not only to locate the filter but also to assure that the filter did not touch the walls of the can and compromise the seals of the holes in the can. By virtue of this invention, both the locator plenum and the perforated tube can be eliminated from the manufacturing process, providing a significant cost savings and ease of manufacturing. As mentioned above, the ribs provide improved hoop strength sufficient to eliminate the perforated tube. The filter as shown in FIG. 2A can be used to eliminate the locator plenum because the ribs act as registrations to center the filter in the can. Additionally, because the ribs extend only partially along the length of the filter and the portion without the ribs has a smaller diameter, the smaller diameter portion can be adjacent the portion of the can having the holes and still remain sufficiently far away so that there is a minimal chance of the seals covering the vent holes being compromised because of contact with the filter.

The novel articles of this invention are also suitable for making mesh substitutes for mechanical attenuation of movement, especially for absorbing energy, restricting movement, or providing a flexing motion. These articles are thus useful as substitutes for rubber bushings and flextubes (flexible cylindrical or annular devices for connecting conduits).

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A wire mesh filter for use in an airbag inflator assembly including a gas generator and an airbag; the wire mesh filter including *a knitted wire mesh having* an annular geometry defined by an axis with two ends and an outer cylindrical wall and a plurality of *at least four* ribs directed along the axis and extending *at least partially* along the outer cylindrical wall, the ribs comprising the mesh filter; wherein gases that are explosively generated by the gas generator pass into and through the wire mesh filter in order to inflate the airbag.

2. The improved filter of claim 1, wherein the ribs extend *fully* along the outer wall between the two ends.

3. The improved filter of claim 1 wherein the wire comprises 304 or 309 stainless steel.

4. An improved airbag assembly comprising a gas generator, an inflatable bag, and a filter through which gas explosively generated passes into and inflates the bag, wherein the improvement comprises a *knitted wire* mesh filter having an annular geometry defining an axis and an outer circumferential wall, said outer circumferential wall being deformed into ribs parallel with said axis, and said mesh filter having an annular geometry defined by an axis with two ends and an outer cylindrical circumferential wall, and a plurality of *at least four* ribs directed along said axis and extending along the outer cylindrical wall, the ribs comprising said mesh filter.

5. A [passanger] *passenger* vehicle having an airbag, wherein the improvement comprises an airbag assembly comprising a gas generator, an inflatable bag, and a filter through which gas explosively generated passes into and inflates the bag, said filter being a *knitted wire* mesh filter having an annular geometry defining an axis and an outer circumferential wall, said outer circumferential wall being deformed into ribs parallel with said axis, and said mesh filter having an annular geometry defined by an axis with two ends and an outer cylindrical circumferential wall, and a plurality of *at least four* ribs directed along said axis and extending along the outer cylindrical wall, the ribs comprising said mesh filter.

*6. The improved filter of claim 4, wherein said ribs extend only partially along the length of said axis.*

*7. The improved filter of claim 1, wherein the distance between adjacent ribs along said outer cylindrical wall approximates the width of each such rib.*

*8. The improved airbag assembly of claim 4, wherein the distance between adjacent ribs along said outer cylindrical wall approximates the width of each such rib.*

*9. The improved airbag assembly of claim 4, wherein said ribs extend only partially along the length of said axis.*

*10. The improved airbag assembly of claim 4, wherein the distance between adjacent ribs along said outer cylindrical wall approximates the width of each such rib.*

*11. The improved airbag assembly of claim 9, wherein the distance between adjacent ribs along said outer cylindrical wall approximates the width of each such rib.*

*12. A passenger vehicle having an airbag, wherein the improvement comprises an airbag assembly comprising a gas generator, an inflatable bag, and a filter through which gas explosively generated passes into and inflates the bag, said filter being a knitted wire mesh filter having an annular geometry defining an axis and an outer circumferential wall, said outer circumferential wall being deformed into ribs parallel with said axis, and said mesh filter having an annular geometry defined by an axis with two ends and an outer cylindrical circumferential wall, and a plurality of at least three ribs directed along said axis and extending only partly along the outer cylindrical wall, the ribs comprising said mesh filter.*

* * * * *